(12) United States Patent
Zhou et al.

(10) Patent No.: US 9,815,519 B2
(45) Date of Patent: *Nov. 14, 2017

(54) PROSTRATION-TYPE BICYCLE

(71) Applicant: Lisha Zhou, Changsha (CN)

(72) Inventors: Lisha Zhou, Changsha (CN); Minghu Rao, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 15/027,588

(22) PCT Filed: Mar. 13, 2014

(86) PCT No.: PCT/CN2014/073336
§ 371 (c)(1),
(2) Date: Apr. 6, 2016

(87) PCT Pub. No.: WO2015/054987
PCT Pub. Date: Apr. 23, 2015

(65) Prior Publication Data
US 2016/0244123 A1     Aug. 25, 2016

(30) Foreign Application Priority Data

Oct. 16, 2013 (CN) .......................... 2013 1 0483858

(51) Int. Cl.
*B62M 1/36* (2013.01)
*B62K 3/00* (2006.01)
*B62K 21/12* (2006.01)

(52) U.S. Cl.
CPC ............... *B62M 1/36* (2013.01); *B62K 3/005* (2013.01); *B62K 21/125* (2013.01); *B62K 3/00* (2013.01)

(58) Field of Classification Search
CPC ........ B62M 1/36; B62K 3/005; B62K 21/125; B62K 3/00; B62J 1/28
See application file for complete search history.

(56) References Cited

U.S. PATENT DOCUMENTS

| 4,248,448 | A | * | 2/1981 | Dmitrowsky | .......... B62K 3/005 280/261 |
| 4,867,441 | A | * | 9/1989 | Blakeman | .......... A63B 22/0046 135/65 |
| 5,501,476 | A | * | 3/1996 | Howell | ..................... A61G 5/02 280/230 |
| 5,848,955 | A | * | 12/1998 | Gooch | ..................... A61G 5/02 482/57 |
| 5,915,710 | A | * | 6/1999 | Miller | .................... B62K 3/005 280/252 |

(Continued)

*Primary Examiner* — Jacob D Knutson
*Assistant Examiner* — Marlon A Arce
(74) *Attorney, Agent, or Firm* — IPro, PLLC; Na Xu

(57) ABSTRACT

A prone bicycle comprising a frame (1), a front wheel (2), a rear wheel (3), a drive mechanism (4) for driving the rear wheel (3), and a pedal mechanism (5) for driving the drive mechanism (4), in which, the front wheel (2) and rear wheel (3) are mounted on the front portion and rear portion of the frame (1), wherein: a forearm support member (6) is mounted at the frame (1) front portion, and a dynamic knee support member (7) having synchronous movement with the pedal mechanism (5) is mounted between the pedal mechanism (5) and the frame (1). Designed with multi-point dynamic and static supports, this prone bicycle improves riding comfort and efficiency and is combined with crawling fitness function.

13 Claims, 14 Drawing Sheets

(56) References Cited

U.S. PATENT DOCUMENTS

| | | | | |
|---|---|---|---|---|
| 6,010,140 | A * | 1/2000 | Guynn | B62J 1/167 |
| | | | | 280/291 |
| 6,070,894 | A * | 6/2000 | Augspurger | B62M 1/14 |
| | | | | 280/249 |
| 6,738,987 | B1 * | 5/2004 | Parks | A63B 21/0552 |
| | | | | 2/1 |
| 6,837,504 | B2 * | 1/2005 | Garner | B62M 1/00 |
| | | | | 280/288.4 |
| 8,752,851 | B2 * | 6/2014 | Chen | B62M 1/36 |
| | | | | 280/230 |
| 9,227,684 | B2 * | 1/2016 | Smith | B62K 5/003 |
| 2004/0051274 | A1 * | 3/2004 | Urban | B62K 3/00 |
| | | | | 280/281.1 |
| 2005/0044981 | A1 * | 3/2005 | Huang | B62K 21/125 |
| | | | | 74/551.8 |
| 2014/0327224 | A1 * | 11/2014 | Chen | B62K 1/00 |
| | | | | 280/205 |

* cited by examiner

PROSTRATION-TYPE BICYCLE

FIELD

The present invention relates to a bicycle, in particular, to a prone bicycle.

BACKGROUND

At present, bicycle is not just a means of transportation but a tool for exercise, leisure, entertainment, tourism purpose, and it tends to be developed further as fitness equipment. However, traditional upright bicycles cannot meet the above demands.

There are many defects in upright bicycles regarding aerodynamics, human anthropotomy, human biology, hemodynamics and ergonomics: 1. As the rider rides upright on the saddle, the large windward area and air resistance will lower riding efficiency and speed; 2. Upright riding position increases strain on the rider's spine; 3. To eliminate air resistance, the rider has to bend his/her upper body on the handlebar, causing high strain on both abdomen and spin; 4. This position is unfavorable for venous blood backflow of lower limbs; 5. The rider's weight and friction with the saddle make his/her hip uncomfortable and susceptible to other injuries.

To tackle the above disadvantages of traditional upright bicycles, prone bicycles have been proposed, for example, CN1126683C "Bicycle with Chain Drive, Multi-Gear and Pedal Outside the rear wheel"; CN2564461Y "Prone Bicycle"; U.S. Pat. No. 5,887,882A "Prone Bicycle" and U.S. Pat. No. 6,050,584A "Bicycle Placing Rider in Substantially Semi-Prone Riding Position". In the above proposals, rider's body posture has been changed from upright to prone or semi-prone posture. However, rider's body support problem remains unsolved.

In traditional upright bicycles, the handlebar and the pedal bear most of the rider's upper limb and lower limb weights respectively, while most of rider's body weight falls on the saddle. As explained in a Chinese Patent (No. CN1126683C), the rider's support points include: legs' support on the pedal; thigh and hip's supports on the saddle; chest and shoulder's support on the armpit support (or the shoulder pad and corset's support) and arms and forearm's support on the handlebar. It is not difficult to see that some supports are unreasonable or not effective. First, different from traditional upright bicycles, in prone position, rider's legs are basically horizontal, making them hardly be supported by the pedal. Unless a special-designed pedal is provided (e.g., one with a strap), rider's foot may fall from the pedal; second, in traditional upright bicycles, saddle is the unique and most effective support; however, in prone position, the saddle can hardly supports rider's body that is basically horizontal, in particular, the hip. The saddle, at most, provides limited support to in-leg, a part that is unsuitable either for male or female from the point view of human anatomy; third, also from human anatomy perspective, taking chest as support will affect one's respiratory system; fourth, armpit's support limits rider's control on handlebar direction and makes it inconvenient for on and off a bicycle. In another two patents CN2564461Y and U.S. Pat. No. 5,887,882A, only shoulder support and thoracic and abdominal support are provided, the defects of which have been explained above; at the same time, the technical schemes disclosed in those two patents fail to provide supports for hip and legs on the saddle. That means, there is no support for lower limb. In this case, rider's leg is likely to fall from the pedal. Similarly, U.S. Pat. No. 6,050,584A only provides unreasonable shoulder support and saddle, the defects of which have been explained above. In addition, all the above technical schemes fail to provide fitness function and possibility of postural change, which makes no good for long-distance ride.

SUMMARY

To tackle the shortages of the prior art, the present inventions provides a prone bicycle, designed with multi-point dynamic and static supports, which improves riding comfort and efficiency and is combined with crawling fitness function.

The present invention solves the above technical problems with the following technical schemes:

A prone bicycle comprises a frame, a front wheel, a rear wheel, a drive mechanism for driving the rear wheel, and a pedal mechanism for driving the drive mechanism, in which, the front wheel and the rear wheel are mounted on the front portion and rear portion of the frame, wherein: a forearm support member is mounted at the frame front portion, and a dynamic knee support member having synchronous movement with the pedal mechanism is mounted between the pedal mechanism and the frame.

The drive mechanism comprises a driven sprocket, a drive sprocket and a chain, in which, the driven sprocket is mounted on the rear wheel, the drive sprocket is mounted at the rear lower portion of the frame, and the chain is surrounded on the driven sprocket and the drive sprocket; the pedal mechanism comprises a pair of cranks and a pair of pedals on both sides of the frame, in which, one end of each crank is permanently connected to the drive sprocket center and the other end is pivotally connected to the pedal.

The dynamic knee support member comprises a pair of rockers, a pair of connecting rods and a pair of knee support pads on both sides of the frame, in which, the upper end of each rocker is pivotally connected to the rear upper portion of the frame, and one end of each connecting rod is pivotally connected to the lower end of the rocker while the other end is pivotally connected to the crank; the rocker, the connecting rod and the crank on one side of the drive sprocket form a group of crank rocker mechanism; and each knee support pad is mounted cantileveredly on the pivot point connecting the rocker and the connecting rod with a support.

The dynamic knee support member comprises a pair of rockers, a pair of connecting rods and a pair of knee support pads on both sides of the frame, in which, the upper end of each rocker is pivotally connected to the middle upper portion of the frame, and one end of each connecting rod is pivotally connected to the lower end of the rocker while the other end is pivotally connected to the crank; the rocker, the connecting rod and the crank on one side of the drive sprocket form a group of crank rocker mechanism; and each knee support pad is mounted cantileveredly in the middle portion of the connecting rod with a support.

The dynamic knee support member comprises a pair of rockers, a pair of connecting rods and a pair of knee support pads on both sides of the frame, in which, the upper end of each rocker is pivotally connected to the middle upper portion of the frame, and one end of each connecting rod is pivotally connected to the lower end of the rocker while the other is arranged with a U-shape connector that is pivotally connected to the pedal spindle; the rocker, the connecting rod and the crank on one side of the drive sprocket form a group of crank rocker mechanism; each knee support pad is mounted in the middle of the connecting rod with a support;

and the bearing support point of the knee support pad and the support is right above the connecting rod.

The drive mechanism comprises a driven sprocket, a drive sprocket and a chain, in which, the driven sprocket is mounted on the rear wheel, the drive sprocket is mounted at the rear upper portion of the frame, and the chain is surrounded on the driven sprocket and the drive sprocket; the pedal mechanism comprises a pair of cranks and a pair of pedals on both sides of the frame, in which, one end of each crank is permanently connected to the drive sprocket center and the other end is pivotally connected to the pedal.

The dynamic knee support member comprises a pair of rockers, a pair of connecting rods and a pair of knee support pads on both sides of the frame, in which, the lower end of each rocker is pivotally connected to the middle lower portion of the frame, and one end of each connecting rod is pivotally connected to the upper end of the rocker while the other is arranged with a U-shape connector that is pivotally connected to the pedal spindle; the rocker, the connecting rod and the crank on one side of the drive sprocket form a group of crank rocker mechanism; each knee support pad is mounted in the middle of the connecting rod with a support; and the bearing support point of the knee support pad and the support is right above the connecting rod.

The dynamic knee support member comprises a pair of guide rails, a pair of connecting rods and a pair of knee support pads on both sides of the frame, in which, each guide rail is fixed to the frame, and one end of each connecting rod is slidably arranged on the guide rail while the other end is arranged with a U-shape connector that is pivotally connected to the pedal spindle; the guide rail, the connecting rod and the crank on one side of the drive sprocket form a group of crank slider mechanism; each knee support pad is mounted in the middle of the connecting rod with a support; and the bearing support point of the knee support pad and the support is right above the connecting rod.

The drive mechanism comprises a driven sprocket, a drive sprocket and a chain, in which, the driven sprocket is mounted on the rear wheel, the drive sprocket is mounted in the middle of the frame, and the chain is surrounded on the driven sprocket and the drive sprocket; the pedal mechanism comprises a pair of cranks, a pair of pedals and a pair of pedal connecting rods on both sides of the frame, in which, one end of each crank is permanently connected to the drive sprocket center, and one end of each pedal connecting rod is pivotally connected to the crank while the other end is pivotally connected to the pedal.

The dynamic knee support member comprises a pair of rockers and a pair of knee support pads on both sides of the frame, in which, the lower end of each rocker is pivotally connected to the rear lower portion of the frame, and the upper end is pivotally connected to the pedal spindle; the rocker, the pedal connecting rod and the crank on one side of the drive sprocket form a group of crank rocker mechanism; and each knee support pad is mounted cantileveredly in the middle of the pedal connecting rod with a support.

The dynamic knee support member comprises a pair of rockers and a pair of knee support pads on both sides of the frame, in which, the upper end of each rocker is pivotally connected to the rear upper portion of the frame, and the lower end is pivotally connected to the pedal spindle; the rocker, the pedal connecting rod and the crank on one side of the drive sprocket form a group of crank rocker mechanism; and each knee support pad is mounted cantileveredly in the middle of the pedal connecting rod with a support.

The dynamic knee support member comprises a pair of guide rails and a pair of knee support pads on both sides of the frame, in which, each guide rail is fixed to the frame, and one end of each pedal connecting rod is pivotally connected to the crank while the other end is arranged with a U-shape connector that is pivotally connected to the pedal spindle; the U-shape connector is slidably arranged on the guide rail; the guide rail, the pedal connecting rod and the crank on one side of the drive sprocket form a group of crank slider mechanism; each knee support pad is mounted in the middle of the pedal connecting rod with a support; and the bearing support point of the knee support pad and the support is right above the pedal connecting rod.

The drive mechanism comprises a spindle of the rear wheel; the pedal mechanism comprises a pair of cranks and a pair of pedals on both sides of the spindle; one end of the crank is permanently connected to the drive sprocket center and the other end is pivotally connected to the pedal.

The dynamic knee support member comprises a pair of rockers, a pair of connecting rods and a pair of knee support pads on both sides of the spindle, in which, the upper end of each rocker is pivotally connected to the middle upper portion of the frame, and one end of each connecting rod is pivotally connected to the lower end of the rocker while the other end is pivotally connected to the crank; the rocker, the connecting rod and the crank on one side of the spindle form a group of crank rocker mechanism; and each knee support pad is mounted cantileveredly on the pivot point connecting the rocker and the connecting rod with a support.

The forearm support member comprises a handlebar and an elbow support pad, in which, the handlebar is connected to the upper portion of frame fork and the elbow support pad is mounted at the rear of the handlebar.

An upper limb support handlebar is arranged below the forearm support member and connected to the middle of the frame fork.

The pedal is mounted with a strap to prevent the sole from dropping off the pedal.

An elastic element is mounted between the knee support pad and the support for shock absorbing.

Compared with the prior art, the invention has the advantages that:

In the prone bicycle of the present invention, a forearm support member is provided at the front portion of the frame, and a dynamic knee support member having synchronous movement with the pedal mechanism is mounted between the pedal mechanism and the frame. The forearm support member provides static support for the rider's upper body, while the dynamic knee support member and the pedal mechanism provide main and supplementary dynamic supports for the lower body. This multi-point static and dynamic support scheme distributes the rider's body weight to several support points and decreases the load on each support point, making it a perfect solution for long-distance riding with good support of human body weight and improved comfortability under prone position; this design eliminates the negative effects of gravity on human body and improves riding efficiency by making the human body weight do work through reasonable adjustment of gravity center of body; in addition, a fitness function is added as the prone riding supported by forearms and knees is similar to crawling.

1—frame; 2—front wheel; 3—rear wheel; 4—drive mechanism; 5—pedal mechanism; 6—forearm support member; 7—dynamic knee support member; 8—upper limb support handlebar; 11—fork; 31—spindle; 41—driven sprocket; 42—drive sprocket; 43—chain; 51—crank; 52—pedal; 53—pedal connecting rod; 61—handlebar; 62—elbow support pad; 71—rocker; 72—connecting rod; 73—knee support pad; 74—support; 75—guide rail; 76—elastic element; 77—anti-slip gasket; 521—strap; 721—U-shape connector; 741—cantilever shaft; 742—shaft sleeve; 743—spring clip; 744—U-shape support; 745—fastening bolt; 746—cross-shape base; 761—bow spring; 762—spiral spring.

DETAILED DESCRIPTION

Embodiment 1

Figure 1:
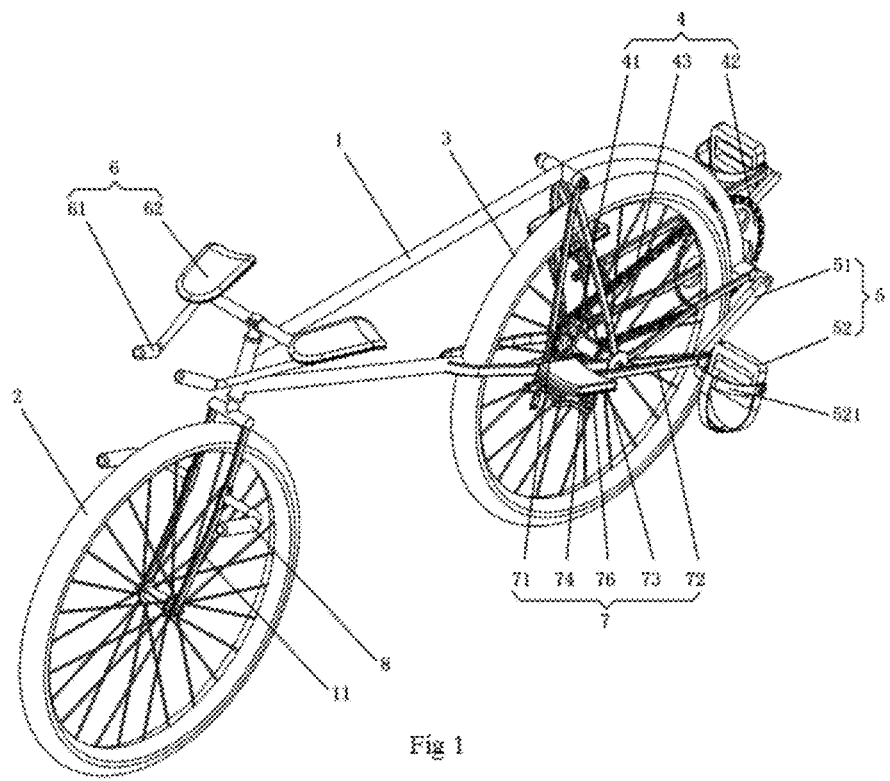
FIG. 1 is a first perspective three-dimensional structure diagram of Embodiment 1 of the present invention.
Figure 2:
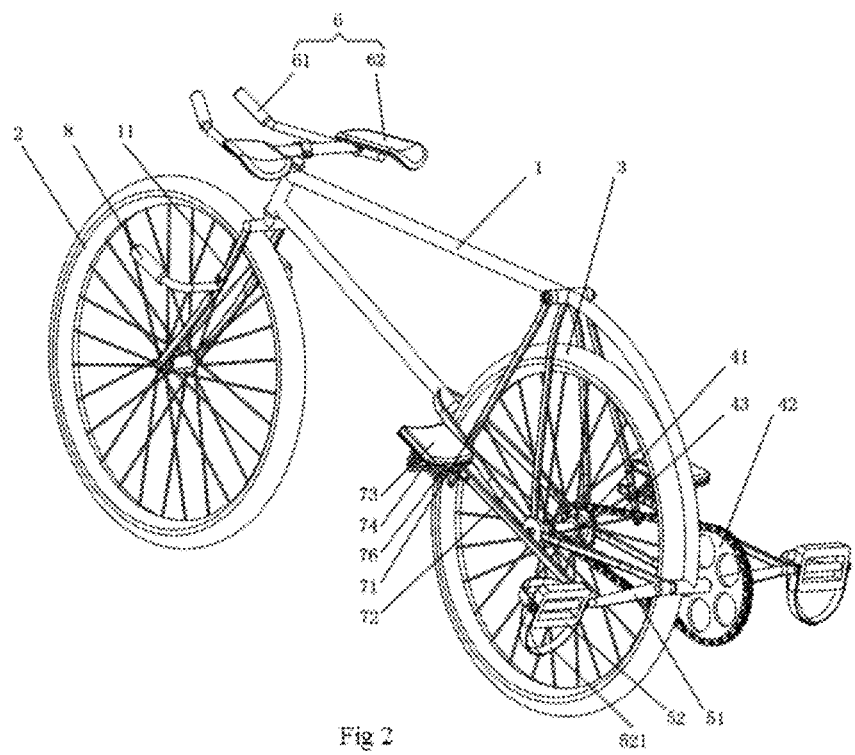
FIG. 2 is a second perspective three-dimensional structure diagram of Embodiment 1 of the present invention.

FIGS. 1 and 2 show a first embodiment of the prone bicycle of the present invention. The prone bicycle comprises a frame 1, a front wheel 2, a rear wheel 3, a drive mechanism 4 for driving the rear wheel 3, and a pedal mechanism 5 for driving the drive mechanism 4, in which, the front wheel 2 and the rear wheel 3 are mounted on the front portion and rear portion of the frame 1, wherein: a forearm support member 6 is mounted at the front portion of frame 1, and a dynamic knee support member 7 having synchronous movement with the pedal mechanism 5 is mounted between the pedal mechanism 5 and the frame 1. By analyzing the prior art, it is found that the support problem of rider's body in prone position can hardly be settled only through static support. The present invention, on the basis of human anatomy, bionics and ergonomics, proposes a multi-point support scheme in combination with static support and dynamic support by reference to human crawling support method and through study of crawling position with elbows and knees on ground. In this invention, the forearm support member 6 provides static support for the rider's upper body that is basically static, while the dynamic knee support member 7 having synchronous movement with the pedal mechanism 5 and the pedal mechanism 5 provide main and supplementary dynamic supports for the moving lower body. This multi-point static and dynamic support scheme distributes the rider's body weight to several support points and decreases the load on each support point, making it a perfect solution for long-distance riding with good support of human body weight and improved comfortability under prone position; this design eliminates the bad effects from human body weight and improves riding efficiency by making the human body weight do work through reasonable adjustment of gravity center of body; in addition, a fitness function is added as the prone riding supported by forearms and knees is similar to crawling.

Figure 21:
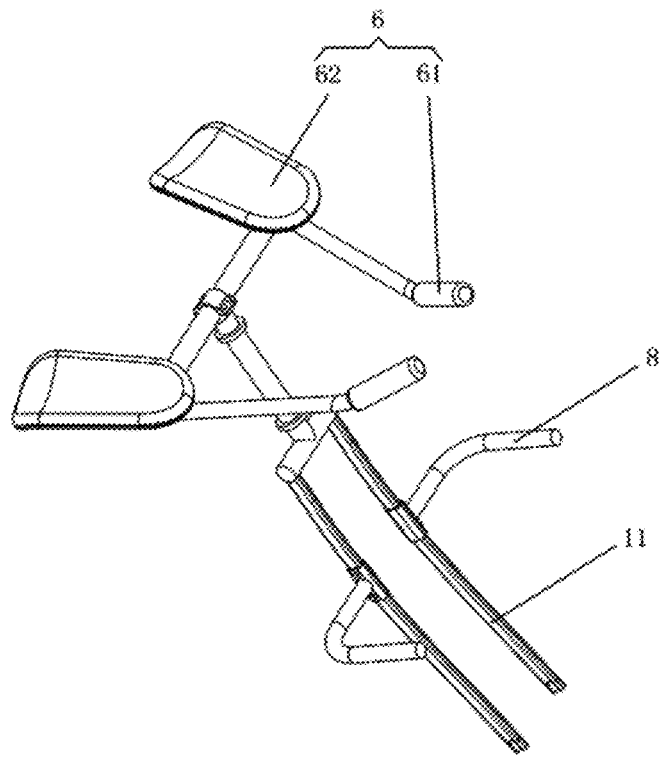
FIG. 21 is a structure diagram of the forearm support member of Embodiment 1.
Figure 22:
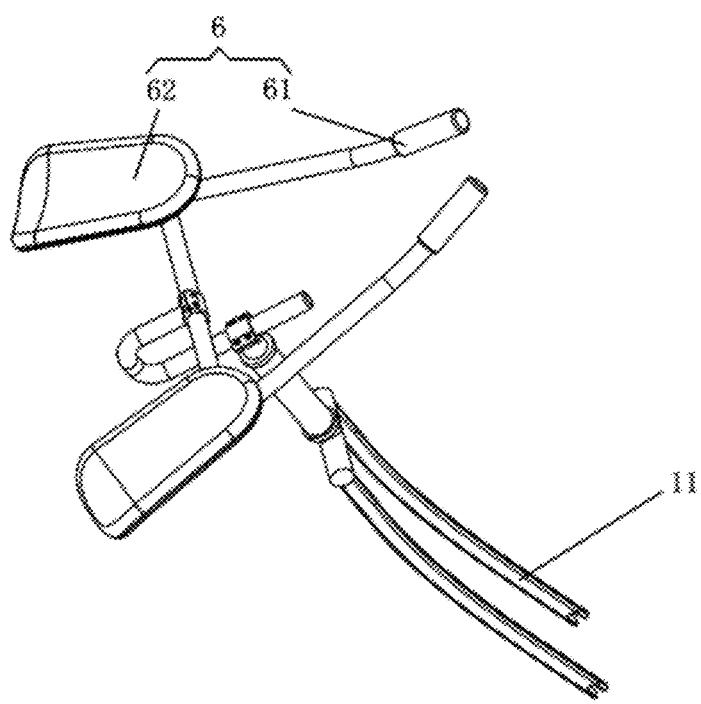
FIG. 22 is a structure diagram of a forearm support member with adjustable back and forth distance.

As shown in FIG. 21, the forearm support member 6 comprises a pair of handlebars 61 and a pair of elbow support pads 62, in which, the pair of handlebars 61 are connected to the upper part of the frame 1 fork 11 where the front part is narrow and the rear part is wide; the front end of the handlebar 61 is upturned and the elbow support pad 62 is mounted at the rear of the handlebar 61; the elbow support pad 62 can distribute elbow stress and improve operation comfort; an upper limb support handlebar 8 is arranged under the forearm support member 6 and is connected to the middle of the frame 1 fork 11. In the course of riding, the forearm support member 6 provides support for rider's upper body and the stress is mainly forced on elbows. Or, the upper limb support handlebar 8 can also be used for supporting the upper body and the stress is mainly forced on palms and wrists. These two supporting methods can be switchable by change of body position at any time during long-distance riding to relieve fatigue. In some embodiments, the handlebar 61 and the elbow support pad 62 can be designed with adjustable angle or with adjustable aft-and-fore distance, as shown in FIG. 22, to adapt to different physical requirements; similarly, the upper limb support handlebar 8 can be designed with adjustable height.

Figure 23:
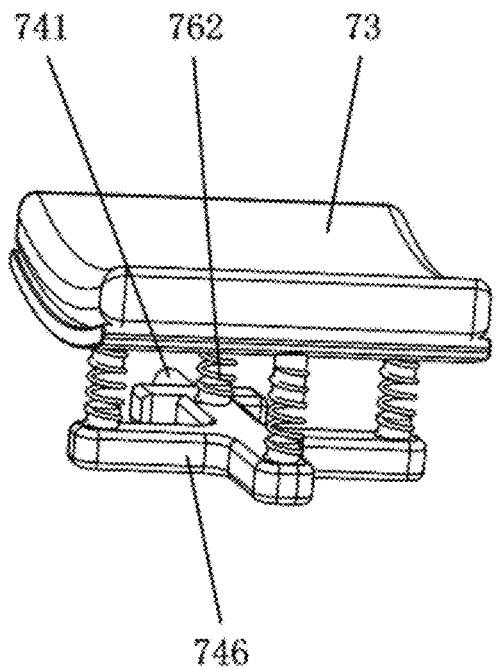
FIG. 23 is a structure diagram of a cantilever installation structure of the knee support pad of Embodiment 1.
Figure 24:
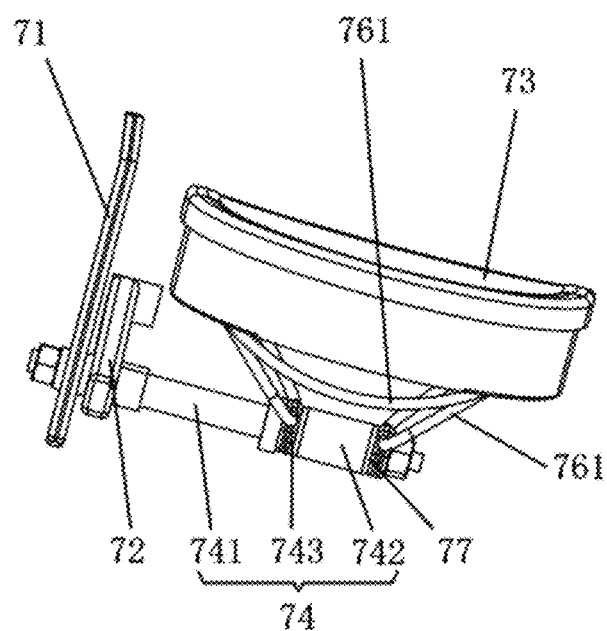
FIG. 24 is a structure diagram of a cantilever installation structure of another knee support pad.

In this embodiment, the drive mechanism 4 comprises a driven sprocket 41, a drive sprocket 42 and a chain 43, in which, the driven sprocket 41 is mounted on the rear wheel 3, the drive sprocket 42 is mounted at the rear lower portion of the frame 1, and the chain 43 is surrounded on the driven sprocket 41 and the drive sprocket 42; the pedal mechanism 5 comprises a pair of cranks 51 and a pair of pedals 52 on both sides of the frame 1, in which, the pair of cranks 51 are arranged in 180 degrees; one end of each crank 51 is fixed to the drive sprocket 42 center and the other end is pivotally connected to the pedal 52. A strap 521 is mounted on the pedal 52 to prevent the sole from dropping off from the pedal 52; the strap 521 comprises an instep belt, a tiptoe belt and a connection belt, in which, the instep belt and the tiptoe belt are coupled in 90 degrees with both ends fixed to two ends of the pedal shaft respectively, and the connection belt is at the middle to connect the instep belt and the tiptoe belt, thus forming two T-shape belts. The dynamic knee support member 7 comprises a pair of rockers 71, a pair of connecting rods 72 and a pair of knee support pads 73 on both sides of the frame 1, in which, the upper end of each rocker 71 is pivotally connected to the rear upper portion of the frame 1, and one end of each connecting rod 72 is pivotally connected to the lower end of the rocker 71 while the other end is pivotally connected to the crank 51; the rocker 71, the connecting rod 72 and the crank 51 on one side of the drive sprocket 42 form a group of crank rocker mechanism; each rocker 71 and each connecting rod 72 are arranged with a plurality of connecting holes for length adjusting to adapt to lower limb length of different riders; each knee support pad 73 is mounted cantileveredly on the pivot point connecting the rocker 71 and the connecting rod 72 through a support 74; an elastic element 76 is mounted between the knee support pad 73 and the support 74 for shock absorbing. As shown in FIG. 23, the knee support pad 73 of this embodiment is designed based on the knee shape to ease the stress and discomfort of the knee. The support 74 comprises a cantilever shaft 741 and a cross-shape base 746, in which, the cross-shape base 746 is mounted on the cantilever shaft 741; one end of the cantilever shaft 741 is connected to the connecting rod 72; the elastic element 76 is composed of spiral springs 762 on four ends of the cross-shape base 746. As shown in FIG. 24, in other embodiments, the support 74 can be composed of a cantilever shaft 741, a shaft sleeve 742 and a spring clip 743. The elastic element 76 comprises four bow springs 761 connected to the base sleeve and the knee support pad 73. The spring clip 743 is arranged at the straight section of the two bow spring 761 in longitudinal arrangement. The spring clip 743 is fixed to one end of the cantilever shaft 741 through the shaft sleeve 742 and the nuts, and an anti-slip gasket 77 is mounted between the spring clip 743 and the shaft sleeve 742. The other end of the cantilever shaft 741 is connected to the connecting rod 72. The elevation angles of the spring clip 743 and the elastic element 76 and knee support pad 73 connected can be adjusted by releasing the nuts. Or, the back and forth position can be slightly adjusted through the spring clip 743 on the straight line of the bow spring 761 to provide most comfortable knee support angle and position for the rider. With the help of the anti-slip gasket 77, tightening nut can strengthen fixing to prevent any undesirable movement of the knee support pad 73.

In riding, the rider knees on the knee support pads 73 that provide two main dynamic supports. In addition, the rider's feet are placed on the pedals 52 with a strap 521 which provide two auxiliary dynamic supports. In this way, the rider can have his/her lower limb reliably supported and also take flexible and effective circling motion with the pedals 52. In the course of riding, rider's legs move along with the rocker 71 and knees make circular trajectory movements while the hip has no up and down movements.

Embodiment 2

Figure 3:
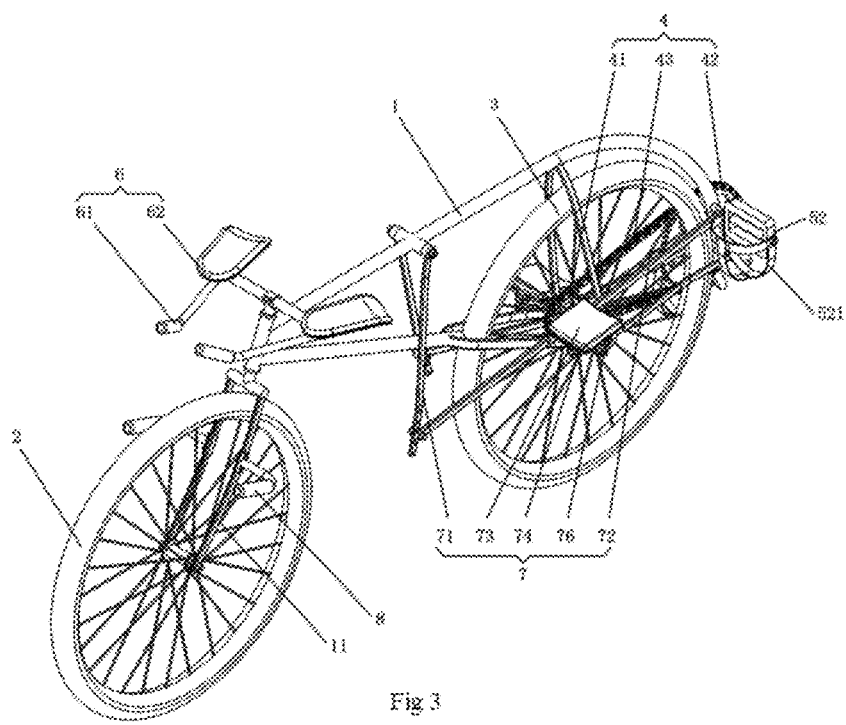
FIG. 3 is a first perspective three-dimensional structure diagram of Embodiment 2 of the present invention.
Figure 4:
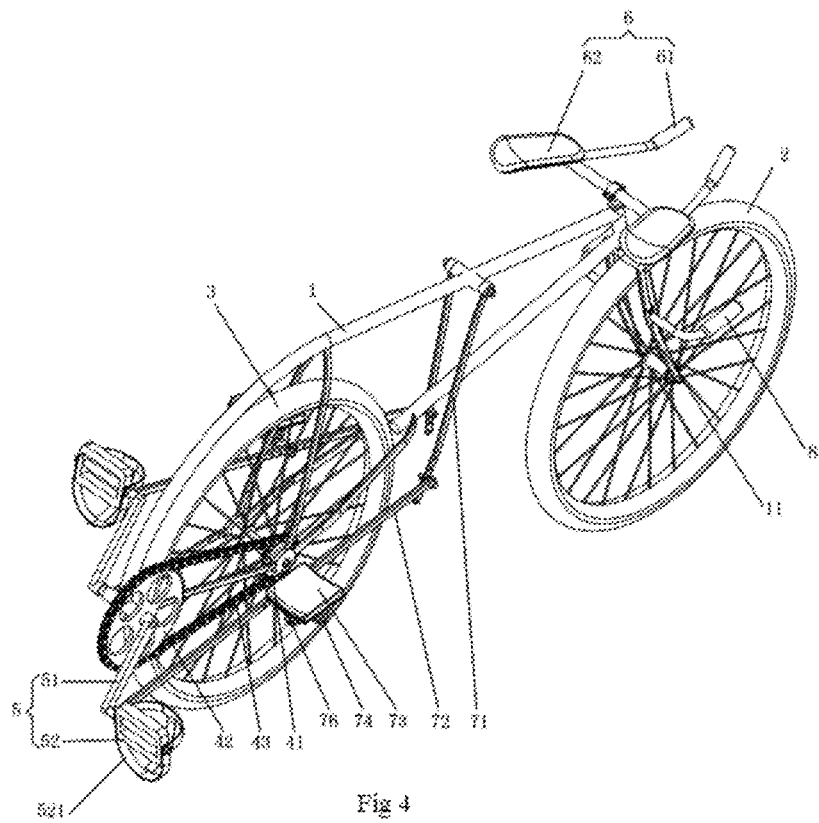
FIG. 4 is a second perspective three-dimensional structure diagram of Embodiment 2 of the present invention.

FIGS. 3-4 show a second embodiment of the prone bicycle of the present invention, which differs from Embodiment 1 only in that: the dynamic knee support member 7 comprises a pair of rockers 71, a pair of connecting rods 72 and a pair of knee support pads 73 on both sides of the frame 1, in which, the upper end of each rocker 71 is pivotally connected to the middle upper portion of the frame 1, and one end of each connecting rod 72 is pivotally connected to the lower end of the rocker 71 while the other end is pivotally connected to the crank 51; the rocker 71, the connecting rod 72 and the crank 51 on one side of the drive sprocket 42 form a group of crank rocker mechanism; and each knee support pad 73 is mounted cantileveredly in the middle of the connecting rod 72 with a support 74; the connecting rod 72 is longer and the middle is arranged with a plurality of adjusting holes for adjusting the position of the knee support pad 73 to adapt to crus length of different riders; and a plurality of adjusting holes are made at the end to which the rocker 71 connects the connecting rod 72, which adjust the rocker 71 length to adapt to thigh length of different riders.

As the movement locus of one point in the middle of the connecting rod 72 is ellipse, the knees also move in elliptical locus rather than arc reciprocating motion along with the knee support pad 73, thereby providing a true simulation of crawling with certain up and down movement of hip. This action is good for rehabilitation and exercise of spine and angiocarpy; in addition, during riding, when the crank 51 moves over the highest point, part of body weight acted on the knee support pad 73 can drive the crank 51 for downward movement, just like the way the rider gets away from the saddle to increase drive with body weight in traditional upright bicycles Embodiment 3

Figure 5:
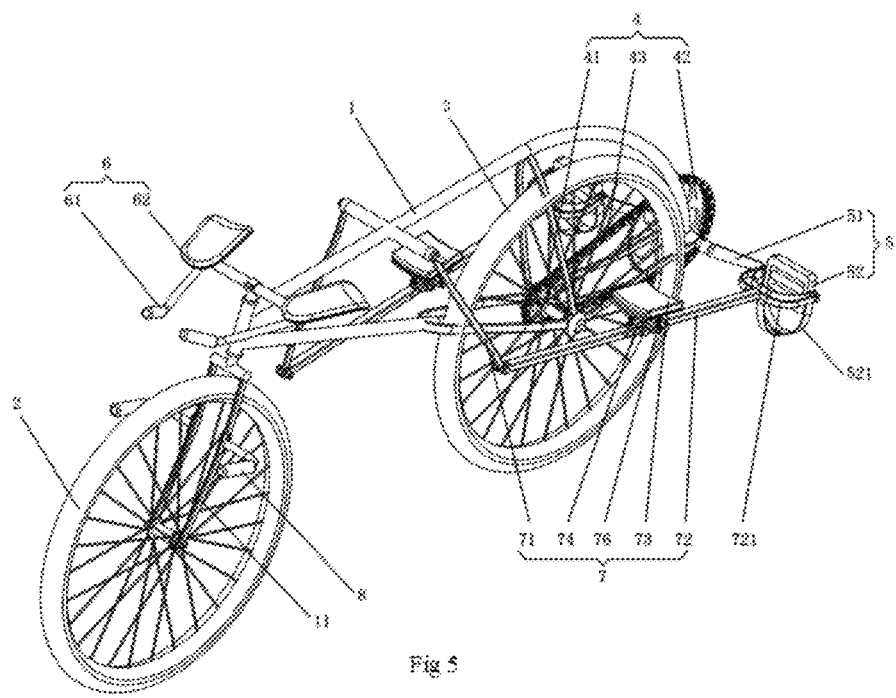
FIG. 5 is a first perspective three-dimensional structure diagram of Embodiment 3 of the present invention.
Figure 6:
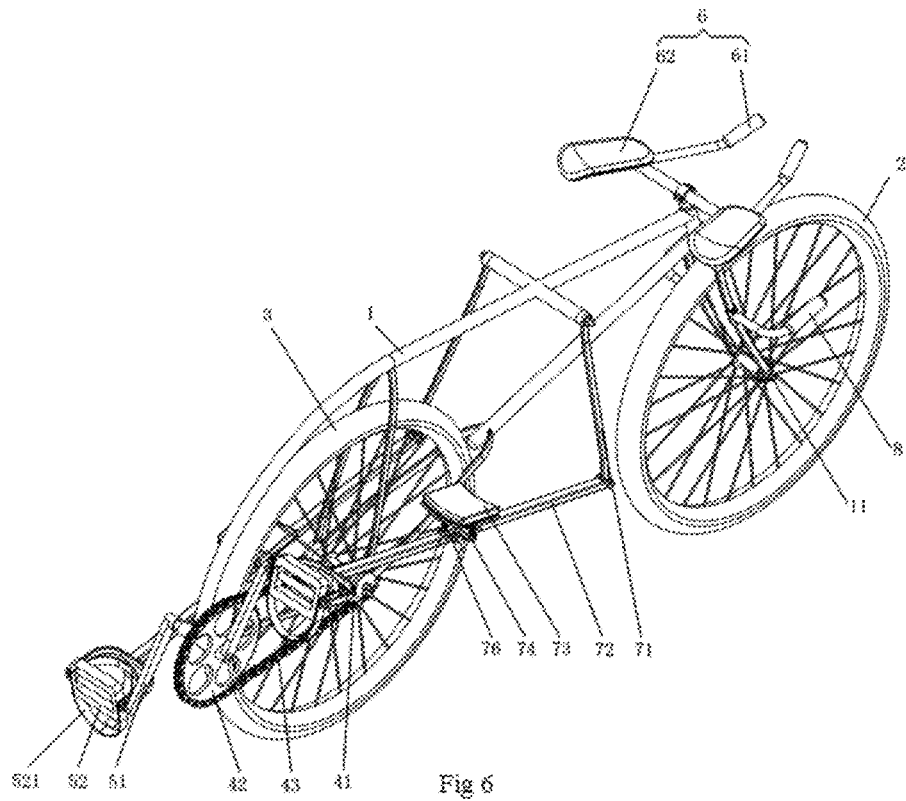
FIG. 6 is a second perspective three-dimensional structure diagram of Embodiment 3 of the present invention.
Figure 25:
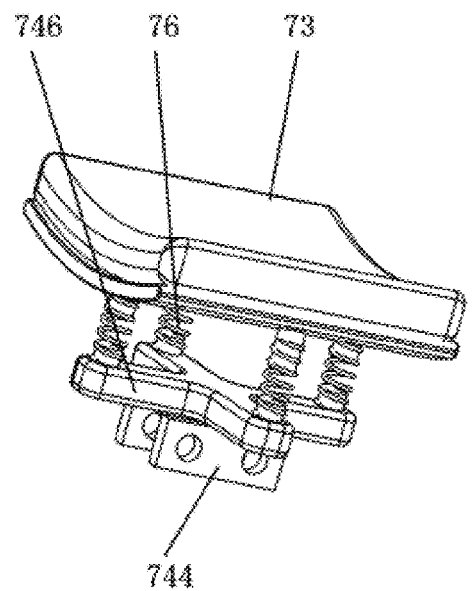
FIG. 25 is a structure diagram of a non-cantilever installation structure of the knee support pad of Embodiment 3.
Figure 26:
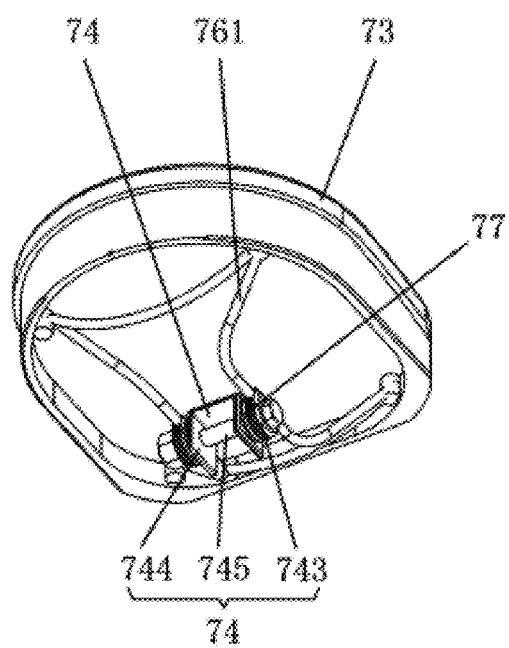
FIG. 26 is a structure diagram of a non-cantilever installation structure of another knee support pad.

FIGS. 5-6 show a third embodiment of the prone bicycle of the present invention, which differs from Embodiment 2 only in that: the dynamic knee support member 7 comprises a pair of rockers 71, a pair of connecting rods 72 and a pair of knee support pads 73 on both sides of the frame 1, in which, the upper end of each rocker 71 is pivotally connected to the middle upper portion of the frame 1, and one end of each connecting rod 72 is arranged with a U-shape connector 721 that is pivotally connected to the pedal 52 spindle while the other end is also mounted with a U-shape structure, through which, is pivotally connected to the lower end of the rocker 71; the rocker 71, the connecting rod 72 and the crank 51 on one side of the drive sprocket 42 form a group of crank rocker mechanism; each knee support pad 73 is mounted in the middle of the connecting rod 72 with a support 74; and the bearing support point of the knee support pad 73 and the support 74 is right above the connecting rod 72 to form a non-cantilever connection. As shown in FIG. 25, the support 74 has no cantilever structure. Instead, a U-shape support 744 is used to fix the cross-shape base 746 at the right above of the connecting rod 72. This non-cantilever connection method provides better stress on the connecting rod 72 and the knee support pad 73 and causes no skew due to connecting rod 72 longer length and cantilever connection. As shown in FIG. 26, in other embodiments, the support 74 can be composed of a fastening bolt 745, a U-shape support 744 and a spring clip 743. A structure composed of four bow springs 761 is used to replace the elastic element 76. The spring clip 743 is mounted cantileveredly on the straight section of the bow springs 761 in longitudinal arrangement. The U-shape support 744 is arranged between two spring clips 743. An anti-slip gasket 77 is provided between the spring clip 743 and the U-shape support 744. The fastening bolt 745 passes through the spring clip 743, the anti-slip gasket 77, the U-shape support 744 and the connecting rod 72 and is fixed right above the connecting rod 72 through nuts. The elevation angles of the spring clip 743 and the elastic element 76 and knee support pad 73 connected can be adjusted by releasing the nuts. Or, the back and forth position can be slightly adjusted through the spring clip 743 on the straight line of the bow spring 761 to provide most comfortable knee support angle and position for the rider. With the help of the anti-slip gasket 77, tightening nut can strengthen fixing to prevent undesirable movement of the knee support pad 73.

Embodiment 4

Figure 7:
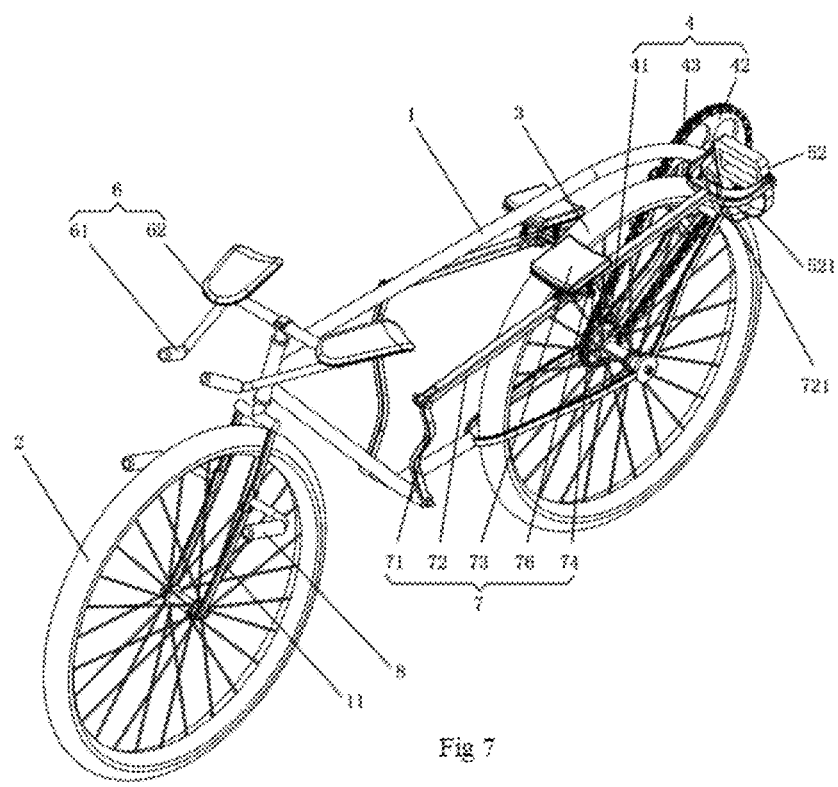
FIG. 7 is a first perspective three-dimensional structure diagram of Embodiment 4 of the present invention.
Figure 8:
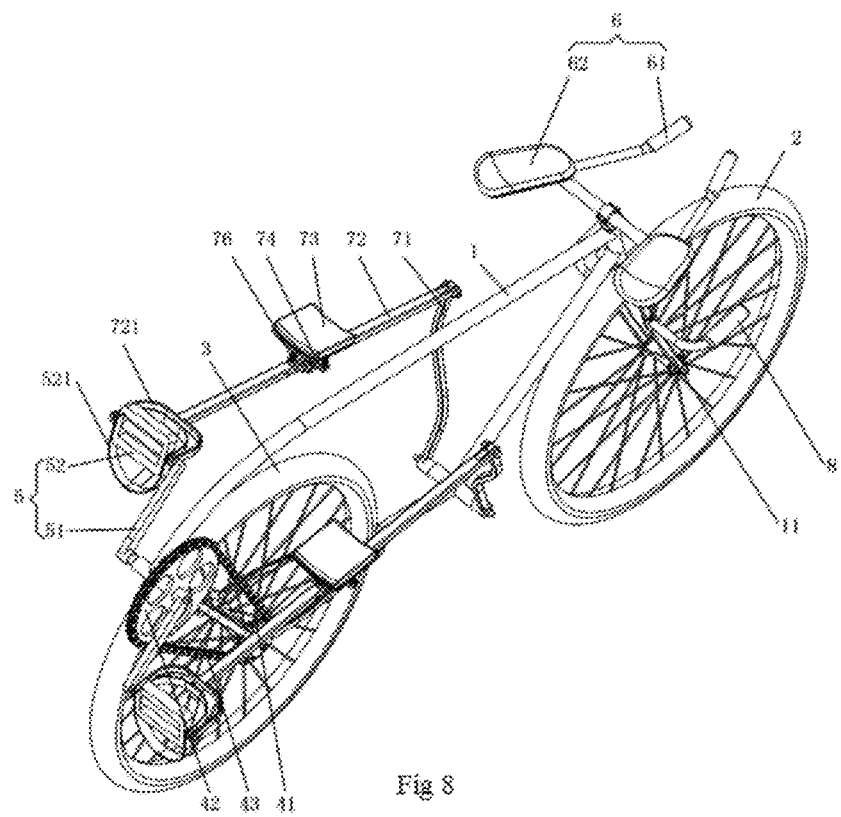
FIG. 8 is a second perspective three-dimensional structure diagram of Embodiment 4 of the present invention.

FIGS. 7-8 show a fourth embodiment of the prone bicycle of the present invention, which differs from Embodiment 1 only in that: the drive mechanism 4 comprises a driven sprocket 41, a drive sprocket 42 and a chain 43, in which, the driven sprocket 41 is mounted on the rear wheel 3, the drive sprocket 42 is mounted at the rear upper portion of the frame 1, and the chain 43 is surrounded on the driven sprocket 41 and the drive sprocket 42; the pedal mechanism 5 comprises a pair of cranks 51 and a pair of pedals 52 on both sides of the frame 1, in which, one end of each crank 51 is permanently connected to the drive sprocket 42 center and the other end is pivotally connected to the pedal 52. The dynamic knee support member 7 comprises a pair of rockers 71, a pair of connecting rods 72 and a pair of knee support pads 73 on both sides of the frame 1, in which, the lower end of each rocker 71 is pivotally connected to the middle lower portion of the frame 1, and one end of each connecting rod 72 is pivotally connected to the upper end of the rocker 71 while the other is arranged with a U-shape connector 721 that is pivotally connected to the pedal 52 spindle; the rocker 71, the connecting rod 72 and the crank 51 on one side of the drive sprocket 42 form a group of crank rocker mechanism; each knee support pad 73 is mounted in the middle of the connecting rod 72 with a support 74; and the bearing support point of the knee support pad 73 and the support 74 is right above the connecting rod 72.

Riding characteristics of this embodiment are as follows: The connection point of the rocker 71 and the frame 1 is changed to the mid-lower part of the frame 1. The drive sprocket 42 is moved to the rear upper portion of the frame 1 at about 45 degrees phase position against the rear wheel 3 to greatly increase the entire height of the dynamic knee support member 7 and the drive mechanism 4 so that smaller wheels can be fitted and the scrapping of drive mechanism 4 with the ground can be prevented at turning. In addition, rider's center of gravity is reduced to improve controllability on the bicycle.

Embodiment 5

Figure 9:
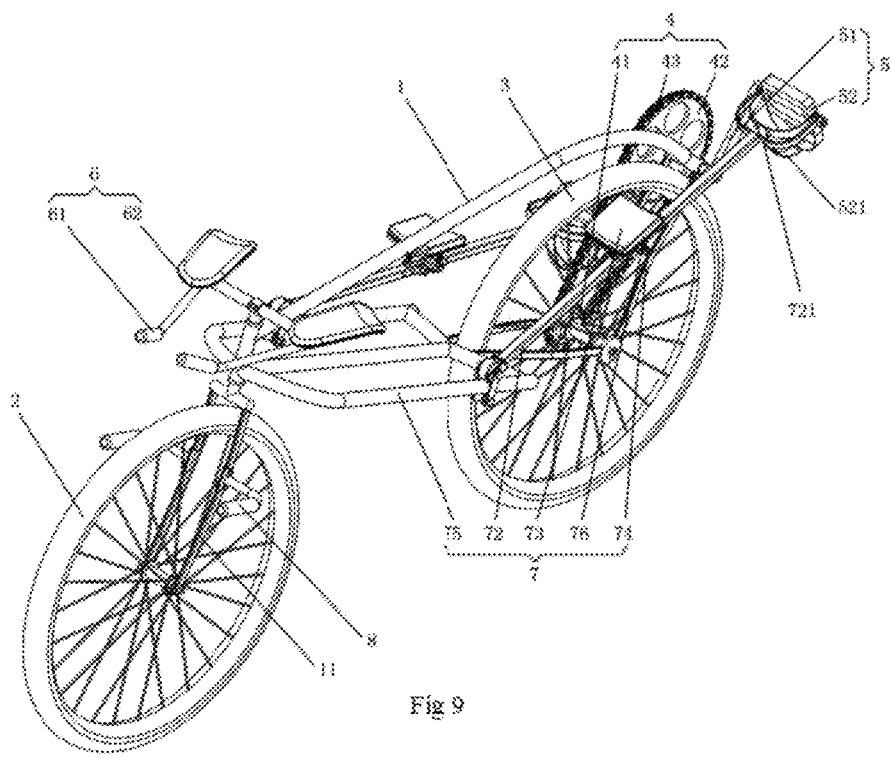
FIG. 9 is a first perspective three-dimensional structure diagram of Embodiment 5 of the present invention.
Figure 10:
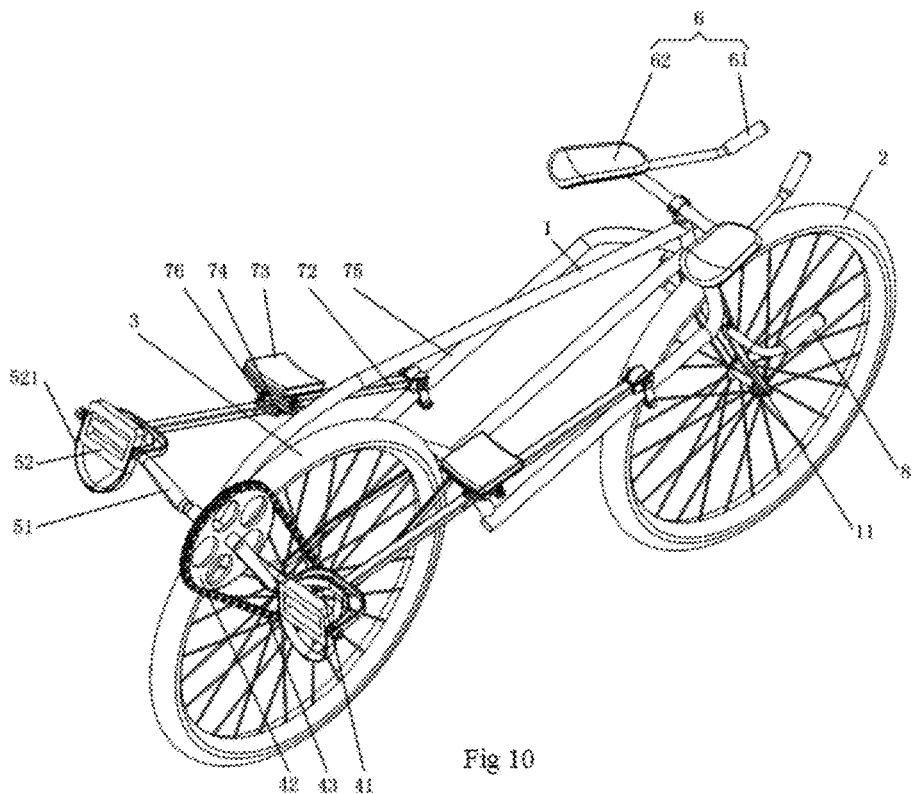
FIG. 10 is a second perspective three-dimensional structure diagram of Embodiment 5 of the present invention.
Figure 27:
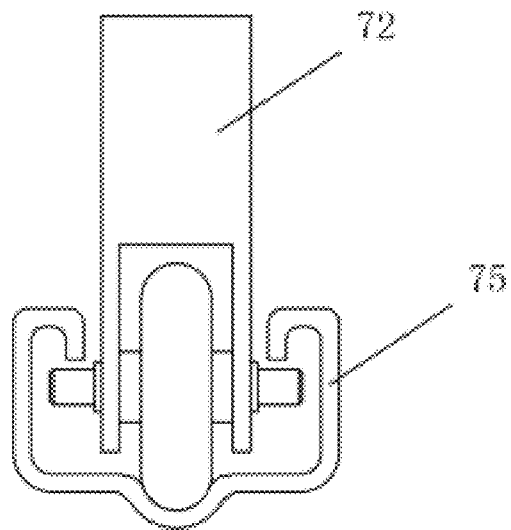
FIG. 27 is a structure diagram of a guide rail support.
Figure 28:
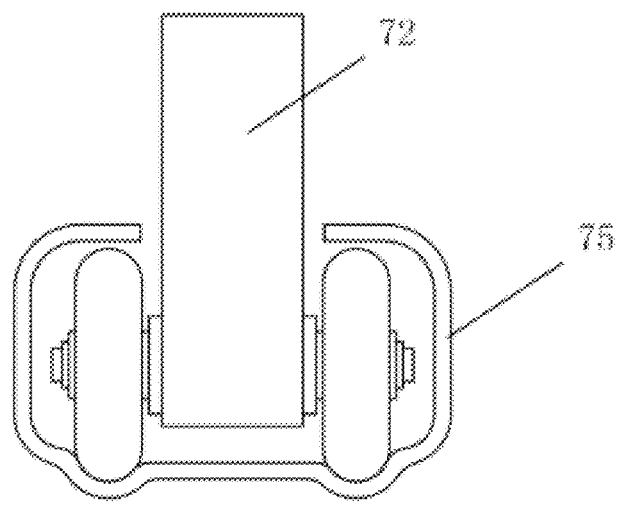
FIG. 28 is a structure diagram of another guide rail support.

FIGS. 9-10 show a fifth embodiment of the prone bicycle of the present invention, which differs from Embodiment 4 only in that: the dynamic knee support member 7 comprises a pair of guide rails 75, a pair of connecting rods 72 and a pair of knee support pads 73 on both sides of the frame 1, in which, each guide rail 75 is fixed to the frame 1; one end of each connecting rod 72 is slidably arranged on the guide rail 75 with wheels, in which, the distances from the guide rail 75 and the connecting rod 72 to the frame 1 are equal; the other end of each connecting rod 72 is arranged with a U-shape connector 721 that is pivotally connected to the pedal 52 spindle; the guide rail 75, the connecting rod 72 and the crank 51 on one side of the drive sprocket 42 form a group of crank slider mechanism; each knee support pad 73 is mounted in the middle of the connecting rod 72 with a support 74; and the bearing support point of the knee support pad 73 and the support 74 is right above the connecting rod 72. In this embodiment, the roller outer ring is a concave curved surface and fits with the guide rail 75 of the circular hollow section. A space roller is mounted under the guide rail 75 to guarantee drive stability. As shown in FIG. 27, in other embodiments, the roller outer ring can be a convex arc surface and fits with the guide rail 75 in concaved section; in addition, two rows of rollers, together with the section, can form a basically C shape structure having a convex and concave channel on bottom, which fits with the guide rail 75. Riding characteristics of this embodiment are basically same as Embodiment 4, which will not be repeated here.

Embodiment 6

Figure 11:
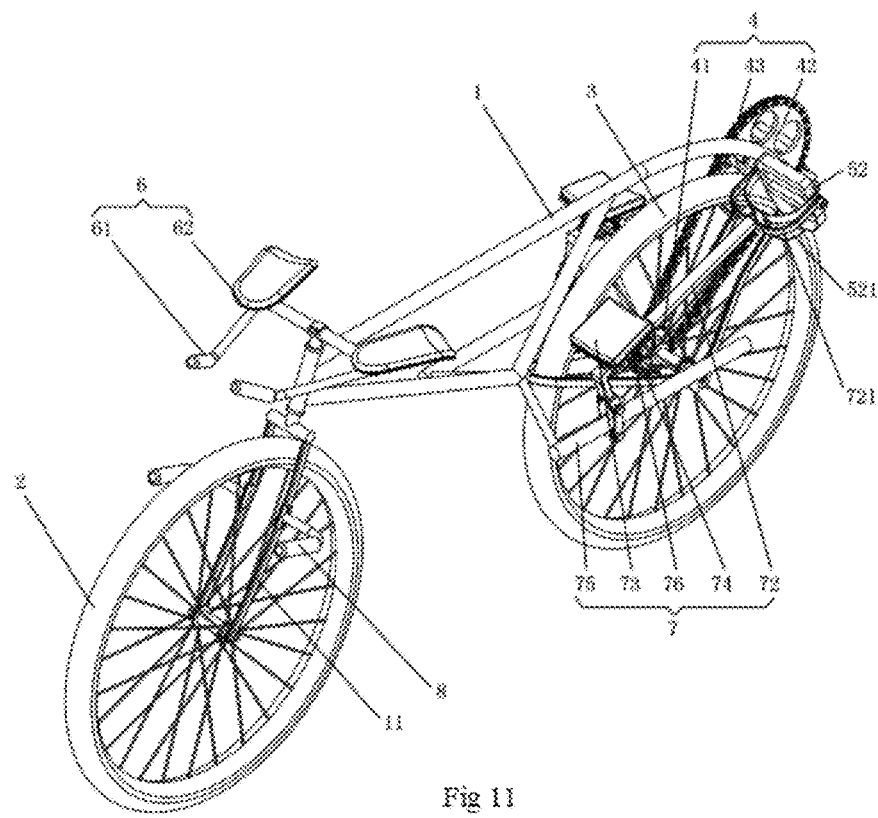
FIG. 11 is a first perspective three-dimensional structure diagram of Embodiment 6 of the present invention.
Figure 12:
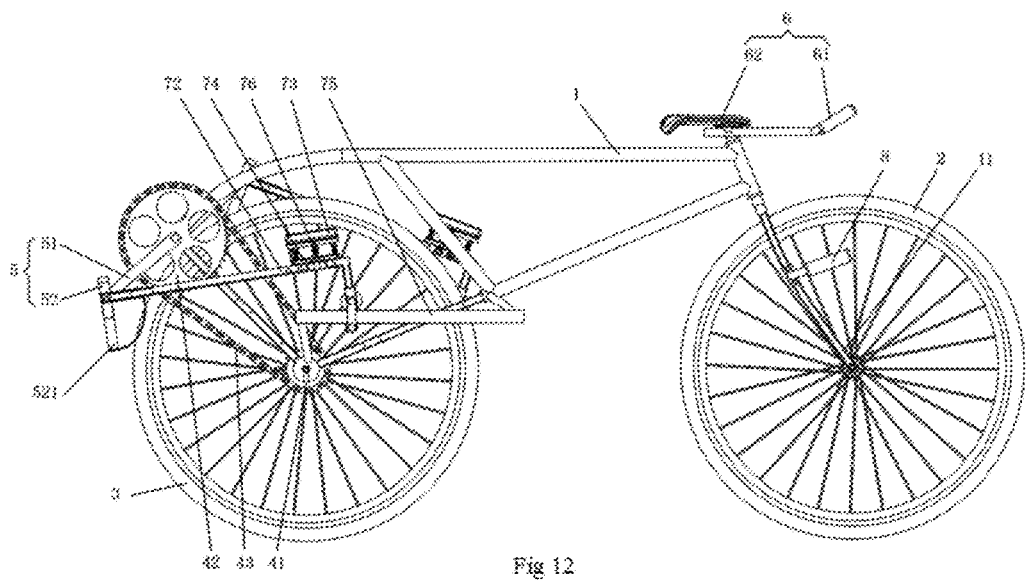
FIG. 12 is a second perspective three-dimensional structure diagram of Embodiment 6 of the present invention.

FIGS. 11-12 show a sixth embodiment of the prone bicycle of the present invention, which differs from Embodiment 5 only in that: a pair of parallel guide rails 75 are mounted on both sides of the rear wheel 3 and are parallel to the ground. A pair of shorter connecting rods 72 are provided, in which, the end of the connecting rod 72 close to the guide rail 75 extends downwards to a short rod, and the lower end of the short rod is mounted with a roller that is slidably mounted on the guide rail 75. The knee support pad 73 is mounted in a position close to the guide rail 75 in the connecting rod 72.

Since in this embodiment, the knee support pad 73 is mounted at the end of the connecting rod 72, and the guide rail 75 is parallel with the ground, riding characteristics of this embodiment are as follows: the knees are basically in a straight reciprocating motion and the hip almost has no up and down movement.

Embodiment 7

Figure 13:
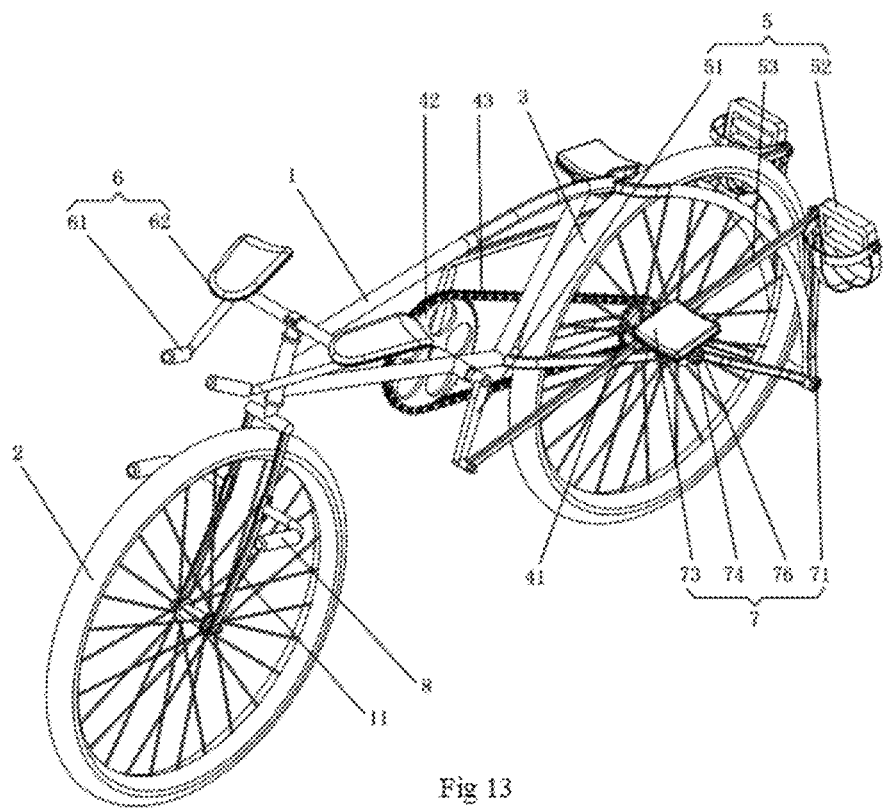
FIG. 13 is a first perspective three-dimensional structure diagram of Embodiment 7 of the present invention.
Figure 14:
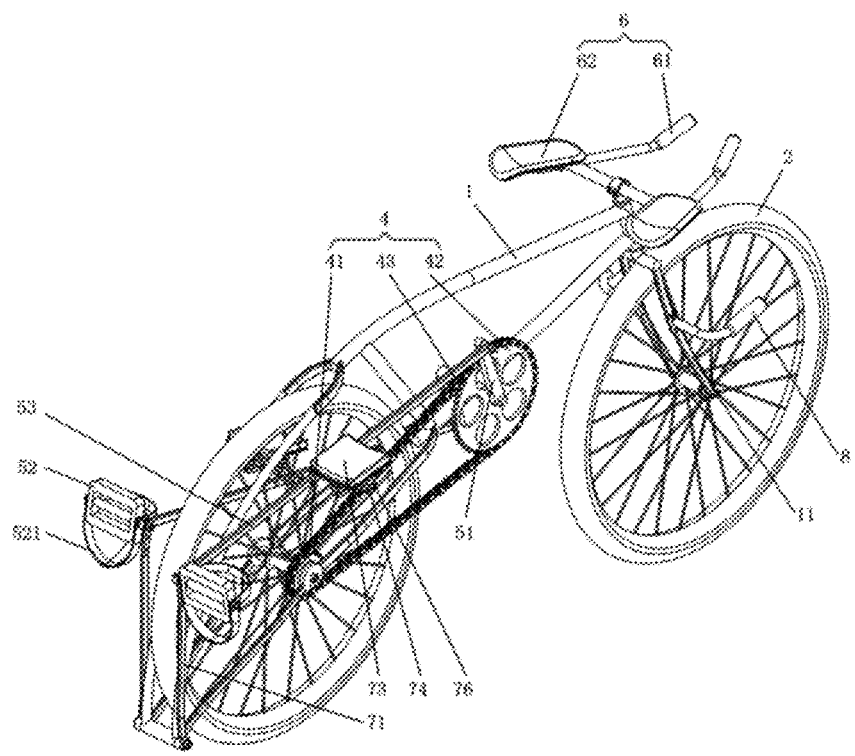
FIG. 14 is a second perspective three-dimensional structure diagram of Embodiment 7 of the present invention.

FIGS. 13-14 show a seventh embodiment of the prone bicycle of the present invention, which differs from Embodiment 1 only in that: the drive mechanism 4 comprises a driven sprocket 41, a drive sprocket 42 and a chain 43, in which, the driven sprocket 41 is mounted on the rear wheel 3, the drive sprocket 42 is mounted in the middle of the frame 1, and the chain 43 is surrounded on the driven sprocket 41 and the drive sprocket 42; the pedal mechanism 5 comprises a pair of cranks 51, a pair of pedals 52 and a pair of pedal connecting rods 53 on both sides of the frame 1, in which, one end of each crank 51 is permanently connected to the drive sprocket 42 center; one end of each pedal connecting rod 53 is pivotally connected to the crank 51 and the other end is pivotally connected to the pedal 52. The dynamic knee support member 7 comprises a pair of rockers 71 and a pair of knee support pads 73 on both sides of the frame 1, in which, the lower end of each rocker 71 is pivotally connected to the rear lower portion of the frame 1, i.e., approx. 45 degrees at the rear lower part of the rear wheel 3, and the upper end is pivotally connected to the pedal 52 spindle; the rocker 71, the pedal connecting rod 53 and the crank 51 on one side of the drive sprocket 42 form a group of crank rocker mechanism; and each knee support pad 73 is mounted cantileveredly in the middle of the pedal connecting rod 53 with a support 74. In installation, the hinged joint at the lower end of the rocker 71 is close to the ground as much as possible to lower the center of gravity of the entire crank rocker mechanism. In this way, the rider's center of gravity is lowered to maintain riding stability.

Riding characteristics of this embodiment are as follows: Rider's hip has up and down movement in the course of riding, the knees take elliptical movement, and pedals take arc repeated movements. When the crank 51 turns over the inflection point, the rider can move the crank 51 downwards with his/her body weight to increase drive efficiency Embodiment 8

Figure 15:
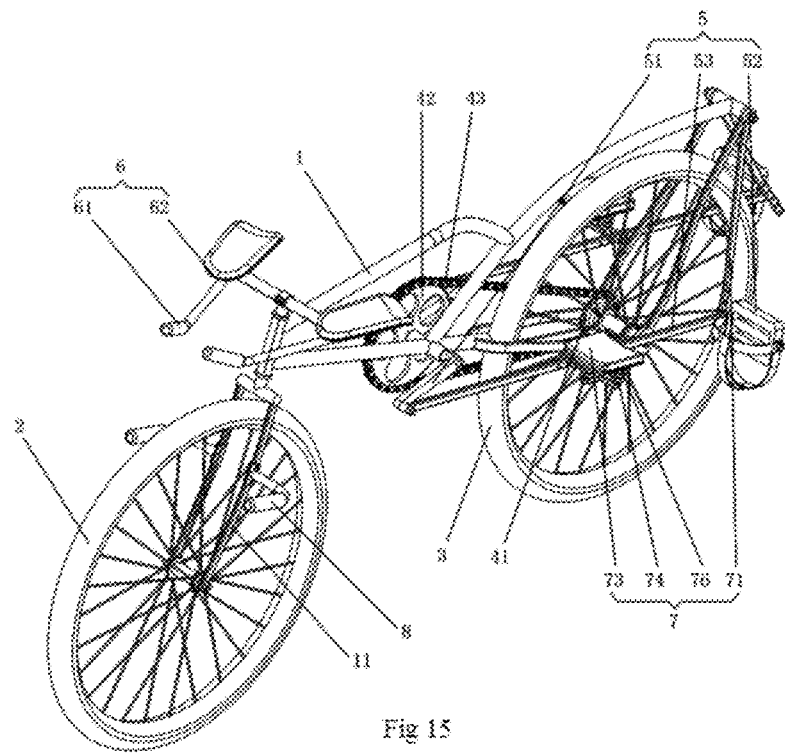
FIG. 15 is a first perspective three-dimensional structure diagram of Embodiment 8 of the present invention.
Figure 16:
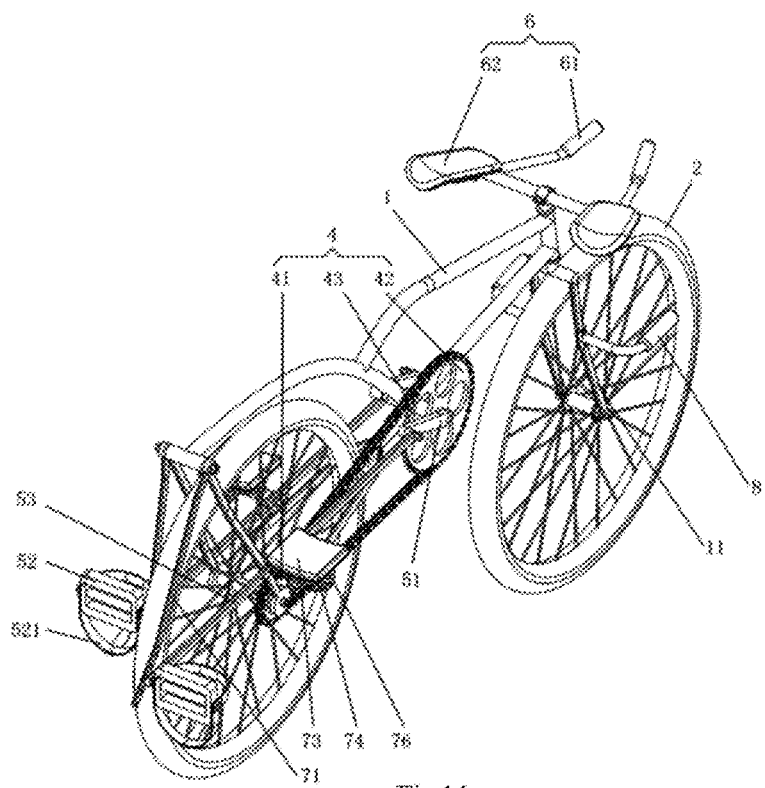
FIG. 16 is a second perspective three-dimensional structure diagram of Embodiment 8 of the present invention.

FIGS. 15-16 show an eighth embodiment of the prone bicycle of the present invention, which differs from Embodiment 7 only in that: the dynamic knee support member 7 comprises a pair of rockers 71 and a pair of knee support pads 73 on both sides of the frame 1, in which, the upper end of each rocker 71 is pivotally connected to the rear upper portion of the frame 1, and the lower end is pivotally connected to the pedal 52 spindle; the rocker 71, the pedal connecting rod 53 and the crank 51 on one side of the drive sprocket 42 form a group of crank rocker mechanism; and each knee support pad 73 is mounted cantileveredly in the middle of the pedal connecting rod 53 with a support 74.

Riding characteristics of this embodiment are basically same as Embodiment 7. The only difference is that smaller wheels are adopted in this embodiment to lower the rider's center of gravity.

Embodiment 9

Figure 17:
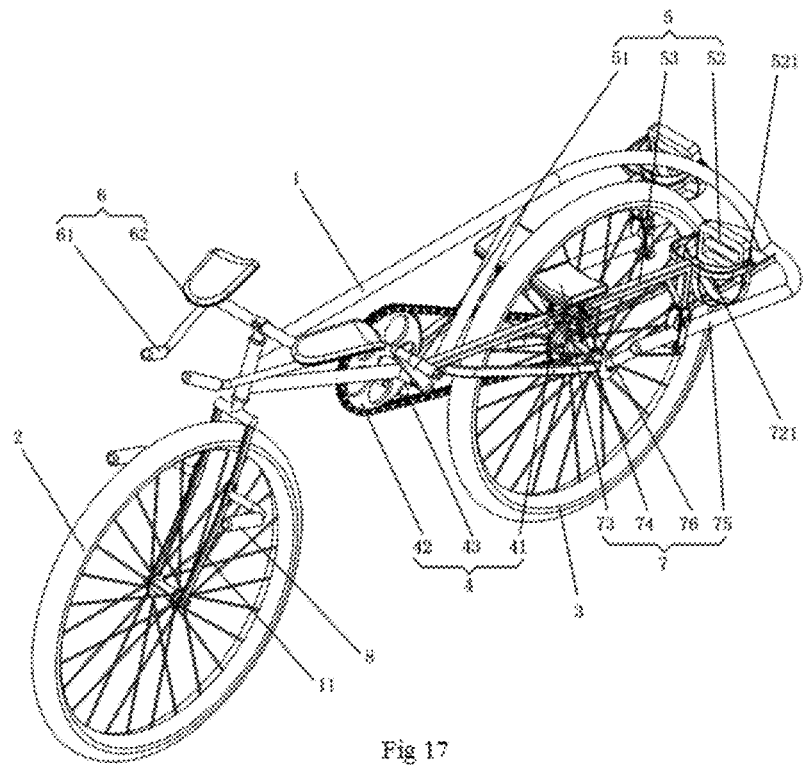
FIG. 17 is a first perspective three-dimensional structure diagram of Embodiment 9 of the present invention.
Figure 18:
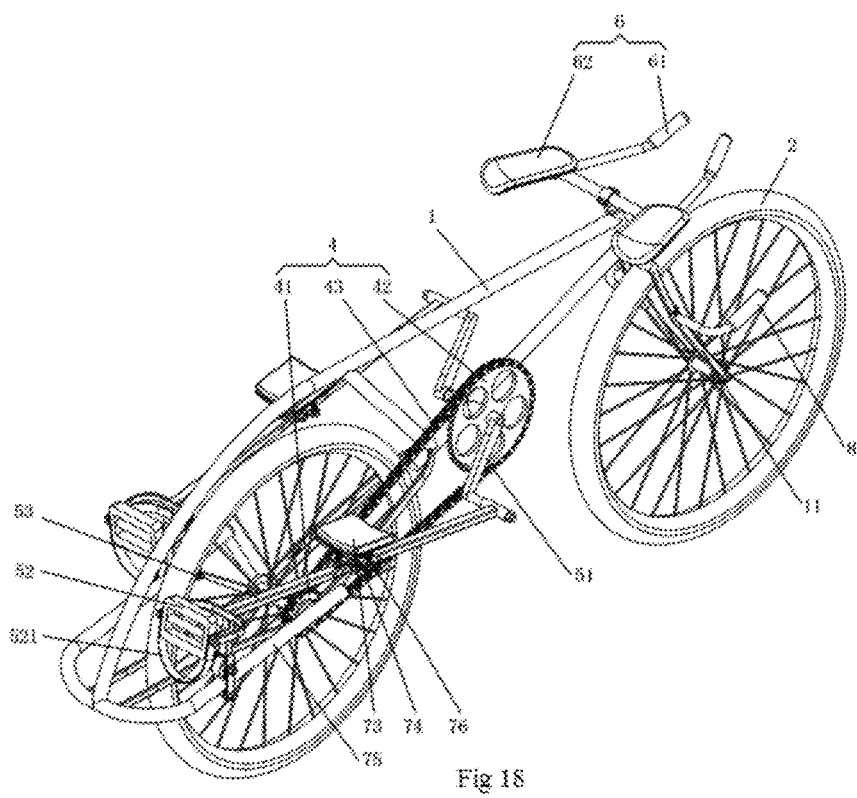
FIG. 18 is a second perspective three-dimensional structure diagram of Embodiment 9 of the present invention.

FIGS. 17-18 show a ninth embodiment of the prone bicycle of the present invention, which differs from Embodiment 7 only in that: the dynamic knee support member 7 comprises a pair of guide rails 75 and a pair of knee support pads 73 on both sides of the frame 1, in which, each guide rail 75 is fixed to the frame 1, in which, the distances from the guide rail 75 and the pedal connecting rod 53 to the frame 1 at the same side are equal; one end of each pedal connecting rod 53 is pivotally connected to the crank 51, and the other end is arranged with a U-shape connector 721 that is pivotally connected to the pedal 52 spindle; the U-shape connector 721 is slidably arranged on the guide rail 75; the guide rail 75, the pedal connecting rod 53 and the crank 51 on one side of the drive sprocket 42 form a group of crank slider mechanism; each knee support pad 73 is mounted in the middle of the connecting rod 53 with a support 74; and the bearing support point of the knee support pad 73 and the support 74 is right above the pedal connecting rod 53. In this embodiment, the connection part of the U-shape connector 721 and straight rod part of the pedal connecting rod 53 is connected with a short rod in straight down direction, and a roller is mounted at the lower end of the short rod. In addition, a stiffener is mounted between the short rod and the pedal connecting rod 53.

Riding characteristics of this embodiment are as follows: Rider's hip has up and down movement in the course of riding, the knees take elliptical movement, and pedals make straight repeated movements. In this embodiment, smaller wheels are adopted in this embodiment to lower the rider's center of gravity.

Embodiment 10

Figure 19:
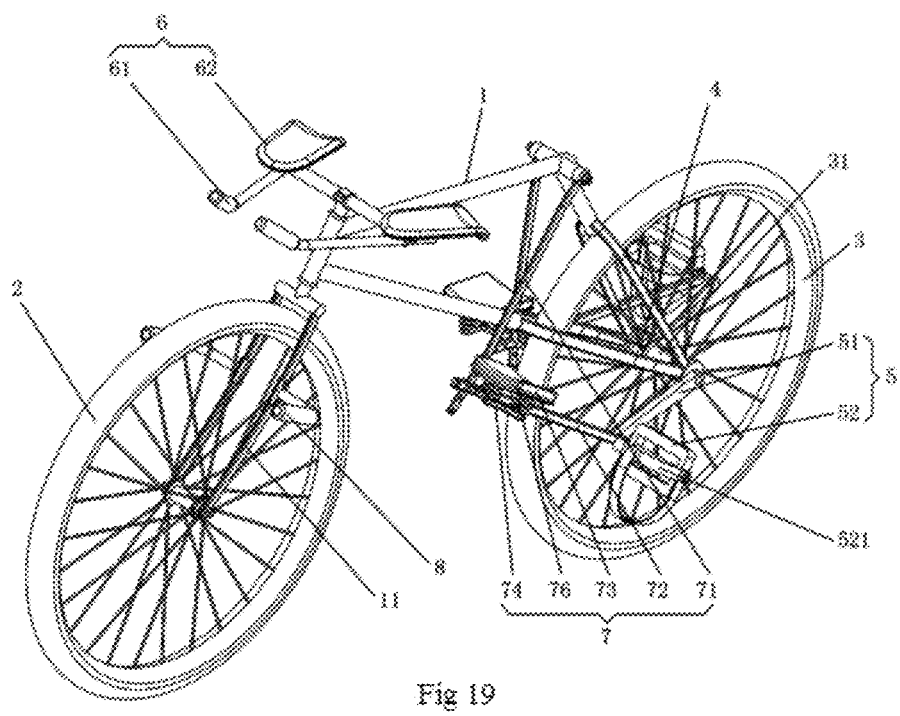
FIG. 19 is a first perspective three-dimensional structure diagram of Embodiment 10 of the present invention.
Figure 20:
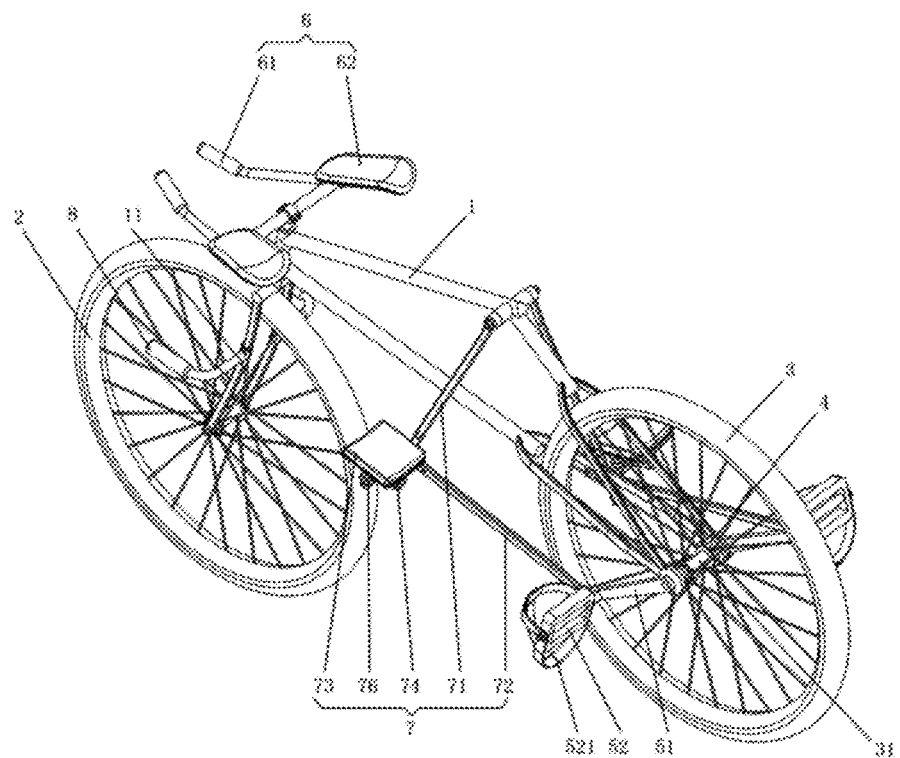
FIG. 20 is a second perspective three-dimensional structure diagram of Embodiment 10 of the present invention.

FIGS. 19-20 show a tenth embodiment of the prone bicycle of the present invention, which differs from Embodiment 1 only in that: the drive mechanism 4 is composed of a spindle 31 of the rear wheel 3. The pedal mechanism 5 comprises a pair of cranks 51 and a pair of pedals 52 on both sides of the spindle 31. One end of each crank 51 is permanently connected to the drive sprocket 42 and the other end is pivotally connected to the pedal 52. The dynamic knee support member 7 comprises a pair of rockers 71, a pair of connecting rods 72 and a pair of knee support pads 73 on both sides of the spindle 31. The upper end of each rocker 71 is pivotally connected to the middle upper portion of the frame 1; one end of each connecting rod 72 is pivotally connected to the lower end of the rocker 71 and the other end is pivotally connected to the crank 51. The rocker 71, the connecting rod 72 and the crank 51 on the one side of the spindle 31 form a crank rocker mechanism. Each knee support pad 73 is mounted cantileveredly on the pivot point connecting the rocker 71 and the connecting rod 72 with a support 74.

Riding characteristics of this embodiment are as follows: The sprocket drive mechanism is removed and the wheel base between the front wheel 2 and the rear wheel 3 is narrowed. In other embodiments, the dynamic knee support member 7 can be any similar structures as shown in Embodiments 2-7

Although the present invention has been described with reference to a number of preferred embodiments, the above description is not intended to be limiting. Those skilled in the art will appreciate that various changes and modifications or alternative embodiments of equivalent changes are possible with these techniques without departing from the scope of the present invention. Therefore, it should be understood that any simple variations, equivalent changes or modifications will fall within the scope of the disclosures without departing from the substantive features of the invention.

The invention claimed is:

1. A prone bicycle comprising a frame, a front wheel, a rear wheel, a drive mechanism for driving the rear wheel, and a pedal mechanism for driving the drive mechanism; wherein the front wheel and rear wheel are mounted respectively on a front portion and a rear portion of the frame; wherein a forearm support member is mounted at a front portion of the frame, and a dynamic knee support member having synchronous movement with the pedal mechanism is mounted between the pedal mechanism and the frame; and wherein the dynamic knee support member is connected to a rear or middle portion of the frame; wherein the drive mechanism comprises a driven sprocket, a drive sprocket and a chain; wherein the driven sprocket is mounted on the rear wheel; wherein the drive sprocket is mounted at a rear lower portion of the frame; wherein the chain is surrounded on the driven sprocket and the drive sprocket; wherein the pedal mechanism comprises a pair of cranks and a pair of pedals on both sides of the frame; wherein one end of each crank is permanently connected to a center of the drive sprocket and the other end is pivotally connected to the pedal; wherein the dynamic knee support member comprises a pair of rockers, a pair of connecting rods and a pair of knee support pads on both sides of the frame; wherein an upper end of each rocker is pivotally connected to a rear upper portion of the frame, and one end of each connecting rod is pivotally connected to a lower end of the rocker while the other end is pivotally connected to the crank; wherein the rocker, the connecting rod and the crank on one side of the drive sprocket form a group of crank rocker mechanism; and each knee support pad is mounted cantileveredly on the pivot point connecting the rocker and the connecting rod with a support.

2. The prone bicycle in claim 1, wherein the dynamic knee support member comprises a pair of rockers, a pair of connecting rods and a pair of knee support pads on both sides of the frame; wherein an upper end of each rocker is pivotally connected to a middle upper portion of the frame, and one end of each connecting rod is pivotally connected to a lower end of the rocker while the other end is pivotally connected to the crank; wherein the rocker, the connecting rod and the crank on one side of the drive sprocket form a group of crank rocker mechanism; and each knee support pad is mounted cantileveredly in the middle of the connecting rod with a support.

3. The prone bicycle in claim 1, wherein the dynamic knee support member comprises a pair of rockers, a pair of connecting rods and a pair of knee support pads on both sides of the frame; wherein an upper end of each rocker is pivotally connected to a middle upper portion of the frame, and one end of each connecting rod is pivotally connected to a lower end of the rocker while the other end is arranged with a U-shape connector that is pivotally connected to a pedal spindle; wherein the rocker, the connecting rod and the crank on one side of the drive sprocket form a group of crank rocker mechanism; wherein each knee support pad is mounted in the middle of the connecting rod with a support; and a bearing support point of the knee support pad and the support is right above the connecting rod.

4. The prone bicycle in claim 1, wherein a forearm support member comprises a handlebar and an elbow support pad wherein the handlebar is connected to an upper portion of a fork and the elbow support pad extends rearward from the handlebar.

5. The prone bicycle in claim 1, wherein an upper limb support handlebar is arranged below a forearm support member and connected to a middle of a fork.

6. The prone bicycle in claim 1, wherein a pedal is mounted with a strap to prevent a sole from dropping off the pedal.

7. The prone bicycle in claim 1, wherein an elastic element is mounted between a knee support pad and a support for shock absorbing.

8. A prone bicycle comprising a frame, a front wheel, a rear wheel, a drive mechanism for driving the rear wheel, and a pedal mechanism for driving the drive mechanism; wherein the front wheel and rear wheel are mounted respectively on a front portion and a rear portion of the frame; wherein a forearm support member is mounted at a front portion of the frame, and a dynamic knee support member having synchronous movement with the pedal mechanism is mounted between the pedal mechanism and the frame; and wherein the dynamic knee support member is connected to a rear or middle portion of the frame; wherein the drive mechanism comprises a driven sprocket, a drive sprocket and a chain; wherein the driven sprocket is mounted on the rear wheel; wherein the drive sprocket is mounted at a rear upper portion of the frame, and the chain is surrounded on the driven sprocket and the drive sprocket; the pedal mechanism comprises a pair of cranks and a pair of pedals on both sides of the frame; wherein one end of each crank is permanently connected to a center of the drive sprocket and the other end is pivotally connected to the pedal; wherein the dynamic knee support member comprises a pair of rockers, a pair of connecting rods and a pair of knee support pads on both sides of the frame; wherein a lower end of each rocker is pivotally connected to a middle lower portion of the frame, and one end of each connecting rod is pivotally connected to an upper end of the rocker while the other end is arranged with a U-shape connector that is pivotally connected to a pedal spindle; wherein the rocker, the connecting rod and the crank on one side of the drive sprocket form a group of crank rocker mechanism; wherein each knee support pad is mounted in a middle of the connecting rod with a support; and a bearing support point of the knee support pad and the support is right above the connecting rod.

9. The prone bicycle in claim 8, wherein the dynamic knee support member comprises a pair of guide rails, a pair of connecting rods and a pair of knee support pads on both sides of the frame; wherein each guide rail is fixed to the frame; wherein one end of each connecting rod is slidably arranged on the guide rail while the other end is arranged with a U-shape connector that is pivotally connected to a pedal spindle; wherein the guide rail, the connecting rod and the crank on one side of the drive sprocket form a group of crank slider mechanism; wherein each knee support pad is mounted in the middle of the connecting rod with a support; and a bearing support point of the knee support pad and the support is right above the connecting rod.

10. A prone bicycle comprising a frame, a front wheel, a rear wheel, a drive mechanism for driving the rear wheel, and a pedal mechanism for driving the drive mechanism; wherein the front wheel and rear wheel are mounted respectively on a front portion and a rear portion of the frame; wherein a forearm support member is mounted at a front portion of the frame, and a dynamic knee support member having synchronous movement with the pedal mechanism is mounted between the pedal mechanism and the frame; and wherein the dynamic knee support member is connected to a rear or middle portion of the frame; wherein the drive mechanism comprises a driven sprocket, a drive sprocket and a chain wherein the driven sprocket is mounted on the rear wheel; wherein the drive sprocket is mounted in the middle of the frame, and the chain is surrounded on the driven sprocket and the drive sprocket; wherein the pedal mechanism comprises a pair of cranks, a pair of pedals and a pair of pedal connecting rods on one side of the frame; wherein one end of each crank is permanently connected to a center of the drive sprocket center; wherein one end of each pedal connecting rod is pivotally connected to the crank and the other end is pivotally connected to the pedal; wherein the dynamic knee support member comprises a pair of rockers and a pair of knee support pads on both sides of the frame; wherein a lower end of each rocker is pivotally connected to a rear lower portion of the frame, and an upper end is pivotally connected to a pedal spindle; the rocker, the pedal connecting rod and the crank on one side of the drive sprocket form a group of crank rocker mechanism; and each knee support pad is mounted cantileveredly in a middle of the pedal connecting rod with a support.

11. The prone bicycle in claim 10, wherein the dynamic knee support member comprises a pair of rockers and a pair of knee support pads on both sides of the frame; wherein an upper end of each rocker is pivotally connected to the rear upper portion of the frame, and a lower end is pivotally connected to a pedal spindle; the rocker, the pedal connecting rod and the crank on one side of the drive sprocket form a group of crank rocker mechanism; and each knee support pad is mounted cantileveredly in a middle of the pedal connecting rod with a support.

12. The prone bicycle in claim 10, wherein the dynamic knee support member comprises a pair of guide rails and a pair of knee support pads on both sides of the frame; wherein each guide rail is fixed to the frame; wherein one end of each pedal connecting rod is pivotally connected to the crank while the other end is arranged with a U-shape connector that is pivotally connected to a pedal spindle; wherein the U-shape connector is slidably arranged on the guide rail; the guide rail, the pedal connecting rod and the crank on one side of the drive sprocket form a group of crank slider mechanism; wherein each knee support pad is mounted in a middle of the pedal connecting rod with a support; and a bearing support point of the knee support pad and the support is right above the pedal connecting rod.

13. A prone bicycle comprising a frame, a front wheel, a rear wheel, a drive mechanism for driving the rear wheel, and a pedal mechanism for driving the drive mechanism; wherein the front wheel and rear wheel are mounted respectively on a front portion and a rear portion of the frame; wherein a forearm support member is mounted at a front portion of the frame, and a dynamic knee support member having synchronous movement with the pedal mechanism is mounted between the pedal mechanism and the frame; and wherein the dynamic knee support member is connected to a rear or middle portion of the frame; wherein the drive mechanism comprises a spindle of the rear wheel; wherein the pedal mechanism comprises a pair of cranks and a pair of pedals on both sides of the spindle; wherein one end of the crank is permanently connected to a center of the drive sprocket and the other end is pivotally connected to the pedal; wherein the dynamic knee support member comprises a pair of rockers, a pair of connecting rods and a pair of knee support pads on both sides of the spindle; wherein an upper end of each rocker is pivotally connected to a middle upper portion of the frame, and one end of each connecting rod is pivotally connected to a lower end of the rocker while the other end is pivotally connected to the crank; wherein the rocker, the connecting rod and the crank on one side of the spindle form a group of crank rocker mechanism; and each knee support pad is mounted cantileveredly on a pivot point connecting the rocker and the connecting rod with a support.

* * * * *